United States Patent [19]

Vogelpohl et al.

[11] Patent Number: 4,940,546
[45] Date of Patent: Jul. 10, 1990

[54] INSTALLATION FOR AEROBIC BIOLOGICAL PURIFICATION OF POLLUTANT-CONTAINING WATER

[75] Inventors: Alfons Vogelpohl, Clausthal-Zellerfeld; Norbert Rabiger, Meisenweg, both of Fed. Rep. of Germany

[73] Assignee: TECON GmbH, Clausthal-Zellerfeld, Fed. Rep. of Germany

[21] Appl. No.: 313,850

[22] Filed: Feb. 23, 1989

[51] Int. Cl.⁵ .................. C02F 3/06; C02F 3/22
[52] U.S. Cl. ........................ 210/613; 210/617;
210/624; 210/628; 210/151; 210/195.3;
210/199; 210/202; 210/259; 210/262; 210/903;
210/188
[58] Field of Search .............. 210/615, 617, 624, 626,
210/903, 151, 195.3, 197, 202, 199, 220, 259,
262, 188, 628

[56] References Cited

U.S. PATENT DOCUMENTS

| | | |
|---|---|---|
| 3,232,434 | 2/1966 | Albersmeyer ............... 210/617 |
| 3,269,542 | 8/1966 | Renzi et al. ................ 210/615 |
| 3,371,033 | 2/1968 | Simmons et al. ............ 210/151 |
| 3,617,540 | 11/1971 | Bishop et al. .............. 210/903 |
| 4,246,111 | 1/1981 | Savard et al. .............. 210/220 |
| 4,322,296 | 3/1982 | Fan et al. .................. 210/903 |
| 4,487,697 | 12/1984 | Böhnke et al. ............. 210/903 |
| 4,561,974 | 12/1985 | Bernard et al. ............ 210/617 |

FOREIGN PATENT DOCUMENTS

| | | |
|---|---|---|
| 3547 | 5/1982 | European Pat. Off. . |
| 130499 | 6/1987 | European Pat. Off. . |
| 1557018 | 3/1970 | Fed. Rep. of Germany . |
| 2705243 | 8/1978 | Fed. Rep. of Germany . |
| 3108629 | 3/1982 | Fed. Rep. of Germany . |
| 2326384 | 4/1977 | France . |
| 62-297889 | 12/1987 | Japan . |
| 661264 | 7/1987 | Switzerland . |

OTHER PUBLICATIONS

Degussa AG brochure, Activated Carbon for Environmental Protection, pp. 1-16.

Primary Examiner—Peter Hruskoci
Assistant Examiner—Christopher Upton
Attorney, Agent, or Firm—Wegner & Bretschneider

[57] ABSTRACT

The invention relates to an installation for aerobic biological purification of pollutant-containing water, which installation consists of an axial-flow submerged reactor and a sedimentation tank for separation of the biosludge from the purified water. The reactor is a pipe containing a two-stage activated-sludge chamber, which pipe contains (a) a first activated-sludge stage in which a driving-jet nozzle is disposed at the downstream end for the dispersion of the air and the microorganisms in the waste water to be purified, and (b) a second activated-sludge stage in which internals are disposed for homogeneous dispersion of the gas bubbles and the microorganisms as well as for immobilization thereof.

15 Claims, 4 Drawing Sheets

INSTALLATION FOR AEROBIC BIOLOGICAL PURIFICATION OF POLLUTANT-CONTAINING WATER

The subject matter of the invention is an installation for aerobic biological purification of pollutant-containing water, which installation consists of a two-stage submerged reactor and a sedimentation tank.

Biological processes for the removal of pollutants from waste waters are known which are carried out in shallow open activated-sludge tanks and sedimentation tanks. The disadvantages of these installations are the smell pollution, the noise pollution, the great space requirement and high capital and energy costs.

The Degussa AG brochure "Activated carbon for environmental protection" discloses a process for the aerobic biological purification of waste water that consists of a purification stage, an activated-sludge stage, a filtration stage and a sedimentation stage, although more detailed structural particulars of the installation are not described therein. Swiss Pat. No. 661,264 describes a purification installation that operates according to the overflow principle. Herein aeration and fixed-bed sections are separated from each other by appropriate internals. By means of the aeration through compressed-air plates the water is forced upward in the aeration section, where it overflows over the upper end of the separating wall onto the fixed bed and percolates downward therethrough. Driving force by means of driving-jet nozzles is not involved in this specification. However, even the use of such a nozzle would have no direct effect in the direction of the fixed bed. This means that an ultrafine dispersion of air bubbles together with microorganisms in the fixed bed cannot be achieved even by employing a driving-jet nozzle. In fact the risk of development of an oxygen gradient exists, with the possibility that anaerobic zones will be formed in the fixed bed.

A similarly operating installation is also described in U.S. Pat. No. 3,468,795. This patent specification relates to a reaction vessel with an aeration zone and a purification zone, which is provided with fixed internals. By means of the aeration, the waste water is transported upward in the separated aeration section, while the oxygen-enriched water travels back downward. In other words, in this principle the liquid stream of the waste water to be purified is deflected. Consequently, finely dispersed microorganisms and air bubbles in the waste water cannot spread unrestrictedly over the entire fixed bed.

West German Offenlegungsschrift* 2,705,243 describes a one-stage process for treatment in high activated-sludge tanks. Herein oxygen-containing gas is intended to be consumed in a single adsorption stage. Thus the purpose of that application is not to integrate several stages in one reactor, but it is to operate with only one stage.

* Translator's note: A German patent application laid open to public inspection as received, before examination and acceptance by the German Patent Office.

It is further known how to purify waste water in high cylindrical towers or deep pits similar to a bubble column. The space requirement for that installation is relatively large. Thus the large structural volumes necessitate correspondingly high capital and energy costs. Further installations are described in the relevant literature (see, for example, Präve B.: Handbuch der Biotechnologie [Handbook of Biotechnology], Wiesbaden 1982; Rehm H.J.: Industrielle Mikrobiologie [Industrial Microbiology], 2nd edition, Berlin-Heidelberg-New York 1981; Fritsche W.: Umweltmikrobiologie [Environmental Microbiology], Berlin 1985; Dohnen K.: Biotechnologie [Biotechnology], Frankfurt 1983).

West German Offenlegungsschrift No. 3,108,629 describes a wastewater treatment plant in which, by means of a pump, the waste water is circulated in a vertical cylindrical external pipe containing an internal flow-conducting pipe. In this case the pumped-off waste water is fed from above to the internal flow-conducting pipe, which projects beyond the liquid level of the upflow chamber. In addition, oxygen-containing gas is injected by a blower into the flow-conducting pipe. To increase the capability of the waste water to dissolve oxygen, both the external and internal pipes forming the circulation chambers ought to extend to a depth of 100 m. This number makes it clear what dimensions such an installation has. Because the installation is of open construction, smell pollution is not to be excluded.

European Patent A No. 0,003,547 discloses a closed reactor for biological purification that has an internal flow pipe into which waste water and air are introduced by means of a nozzle. Furthermore, European Patent A No. 0,130,499 discloses an apparatus for biological waste-water purification which is a closed reactor vessel that contains an external jacket and a flow-conducting pipe disposed vertically and concentrically with respect to each other. If the waste water is particularly badly polluted and the purification insufficient, the purification is carried out in a double installation. In this case the waste water treated in the first reactor is fed to the second reactor and therein treated in a second stage. The use of such loop-type reactors has some advantages. However, a large power input is needed to maintain the loop flow, whereby the specific energy consumption in such installations is relatively high. Furthermore, French Patent A No. 2,326,384 discloses how to aerate waste water and discharge it into an open tank by means of a driving-jet nozzle. German Patent A No. 1,557,018 and West German Offenlegungsschrift No. 2,705,243 also describe how to use driving-jet nozzles in reactors for mixing gases and liquids.

The object of the present invention is to provide an installation for aerobic biological purification of pollutant-containing water, in which the above-mentioned disadvantages can be avoided and in particular waste water can be purified for lower energy and capital costs. The installation consists of an axial-flow submerged reactor and a sedimentation tank to separate the biosludge from the purified water.

The object is achieved by providing that the reactor is a pipe containing a two-stage activated-sludge chamber, which pipe contains (a) a first activated-sludge stage in which a driving-jet nozzle is disposed at the front end for the dispersion of the air and the microorganisms in the waste water to be purified, and (b) a second activated-sludge stage in which internals are disposed for homogeneous dispersion of the gas bubbles and the microorganisms as well as for immobilization thereof.

The reactor can be operated as a horizontally or vertically disposed vessel. Other arrangements are also possible. Nevertheless, the reactor is preferably constructed as a vertically disposed vessel, in the lower part of which the first activated-sludge stage and in the upper part of which the second activated-sludge stage is located. The reaction vessel is a closed pipe, in which a sedimentation tank can also be disposed between the activated-sludge stages. A driving-jet nozzle is disposed at the front end of the first stage for dispersion of the air and the microorganisms. An air-supply line is located above the driving-jet nozzle. Additional air-supply lines can be disposed above this air-supply line as needed. The supply lines for the waste water to be purified and the recycled biomass are located below the driving-jet nozzle. Internals for immobilization of the microorganisms are present in the second activated-sludge stage.

Another object of the invention is to provide a process for aerobic biological purification of pollutant-containing water.

This object is achieved by providing that (a) the waste water to be purified is fed through a line to the tubular reactor containing a two-stage activated-sludge chamber, (b) microorganisms and supply air are very finely dispersed in the waste water in the first activated-sludge stage by means of a driving-jet nozzle disposed at the front end of the stage, (c) thereafter the air-water-microorganisms mixture is subjected to a posttreatment in the second stage, air bubbles, microorganisms and water being homogeneously dispersed by the internals, and (d) the mixture then flows through a connecting pipe into a sedimentation vessel, where the separation of the microorganisms from the purified water takes place.

After flowing through the first activated-sludge stage, the water/gas/organisms mixture can be passed if necessary into a degassing pipe and the degassed liquid can be passed into a sedimentation tank. The air is supplied through a line above the driving jet. If necessary, additional air can be supplied through additional lines above the first air-supply line. In the process according to the invention, the hydrocarbon compounds present in the waste water are preferably degraded in the first activated-sludge stage and nitrogen compounds are removed in the second activated-sludge stage.

In the installation according to the invention, therefore, in contrast to the prior art, the activated-sludge stage comprising a free-jet zone and containing the nonimmobilized microorganisms and the fixed-bed stage equipped with internals for the purpose of immobilization of the microorganisms are mounted in one reactor. The principle of the described process therefore depends on providing that the biological waste-water purification is achieved by aeration of a biomass-water mixture in a two-stage activated-sludge chamber that is mounted in an axial-flow tubular reactor. In the process, waste water, biomass and air mass are supplied and an equivalent quantity of biomass-water mixture is removed continuously. In the first stage, the supply air and the recycled biomass are dispersed very finely in the waste water by the driving jet. In the second stage, a homogeneous dispersion of the air bubbles and the bacterial mass is maintained in the waste water by internals. A high bacterial concentration is achieved by the formation of a microorganism film on the internals. Simultaneously, the sludge production at the end of the second stage is decreased, and so the dimensions necessary for the sedimentation tank are smaller. Because of the intensive mixing and aeration by means of a driving jet, intermediate sedimentation before the fixed bed is normally unnecessary, since hereby the sludge production is considerably decreased. Clogging of the channels between the internals therefore cannot occur in the installation according to the invention, even though no sedimentation stage is provided between the two stages. For severely polluted waste water, however, it can be advisable to install an intermediate sedimentation stage.

Since those skilled in the art would be bound to fear damage to the microorganisms, it is unexpected that the installation according to the invention can be operated with the driving jet, which generates a high shear gradient in its driving-jet zone. It has been possible, however, to observe such operation according to the invention. Because the first activated-sludge stage is not separated from the fixed bed, it would have been further assumed that the immobilized microorganisms would become detached again. However, the gas and organisms are so finely dispersed by the driving jet that a homogeneous dispersion of the gas/water/organisms mixture is produced in the fixed bed. In contrast to the prior art, therefore, there is no danger that anaerobic zones will form. Finally, it had been thought that the sedimentation behavior would be impaired in a finely dispersed mixture of organisms. Even this fear has unexpectedly proved unfounded in employment of the installation according to the invention.

A further feature of the installation according to the invention is that the two-stage reactor can be operated both as a small compact installation and as a large-volume vessel. Especially in the employment as a small installation, it proves to be an advantage that the reactor can be placed in any desired position, since hereby it can be installed even under difficult space conditions. Moreover, smell pollution is prevented by the construction of the reactor as a closed pipe.

The installations according to the invention are illustrated in FIGS. 1, 2, 3 and 4.

Figure 1:
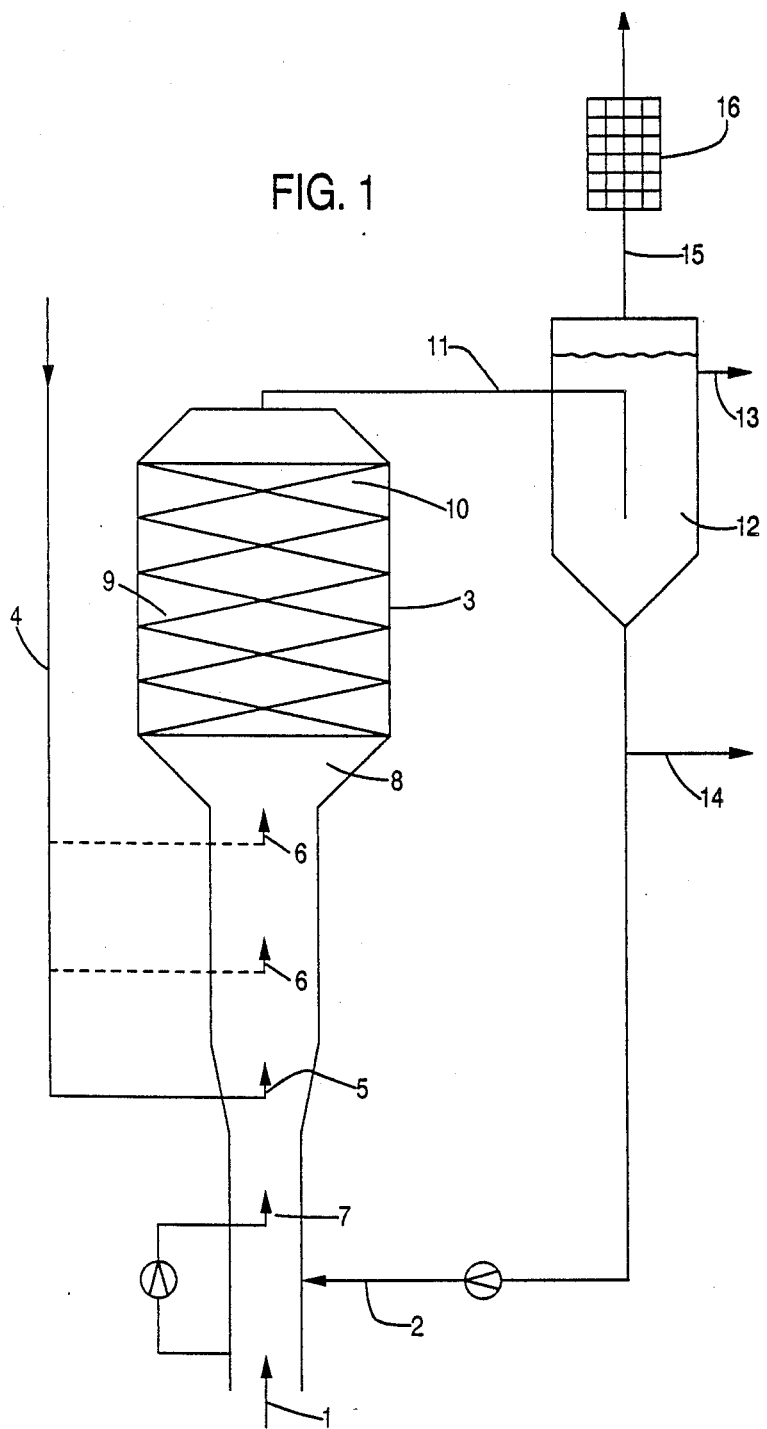
FIG. 1 shows an installation with a vertically disposed reactor.

In the following, the invention will be explained in more detail by reference to the figures, which show a schematic construction for carrying out the process of the invention in an exemplary design: As shown in FIG. 1, the waste water to be purified is fed through supply line 1 together with the recycled biomass from the return line 2 into the reactor 3 surrounding a two-stage activated-sludge chamber. The air is supplied through supply line 4 to the aeration nozzle 5 and to the additional aeration nozzles 6. The driving jet nozzle 7 generates in its free-jet zone a high shear gradient, whereby the supply air and the biosludge are very finely dispersed. After flowing through the first stage 8, the air-biomass-water mixture enters the second stage 10, which is equipped with internals or a fixed bed in the case of fixed internals 9. By means of the internals, a largely uniform dispersion of air bubbles, biomass and waste water flowing over the cross section of the second stage is achieved. Moreover, a microorganism film forms on the surface of the internals, by which film the concentration of microorganisms is greatly increased. The internals can consist of particulate filling material. For example, activated-charcoal granules, foam-glass rings of high porosity or an ordered or disordered packing with a large surface area per unit volume can be considered. It is also possible to provide fixed internals.

The mixture flows from the second activated-sludge stage through the connecting pipe 11 into the sedimentation tank 12, where the separation of the microorganism-containing sludge from the purified waste water takes place. The waste water exits the sedimentation tank through the waste water exit line 13, while the settled biosludge is recycled to the reactor or drawn off through the excess-sludge line 14. The air being outgassed in the sedimentation tank is released through the exhaust-air line 15 and if necessary is purified with a filter 16.

Figure 2:
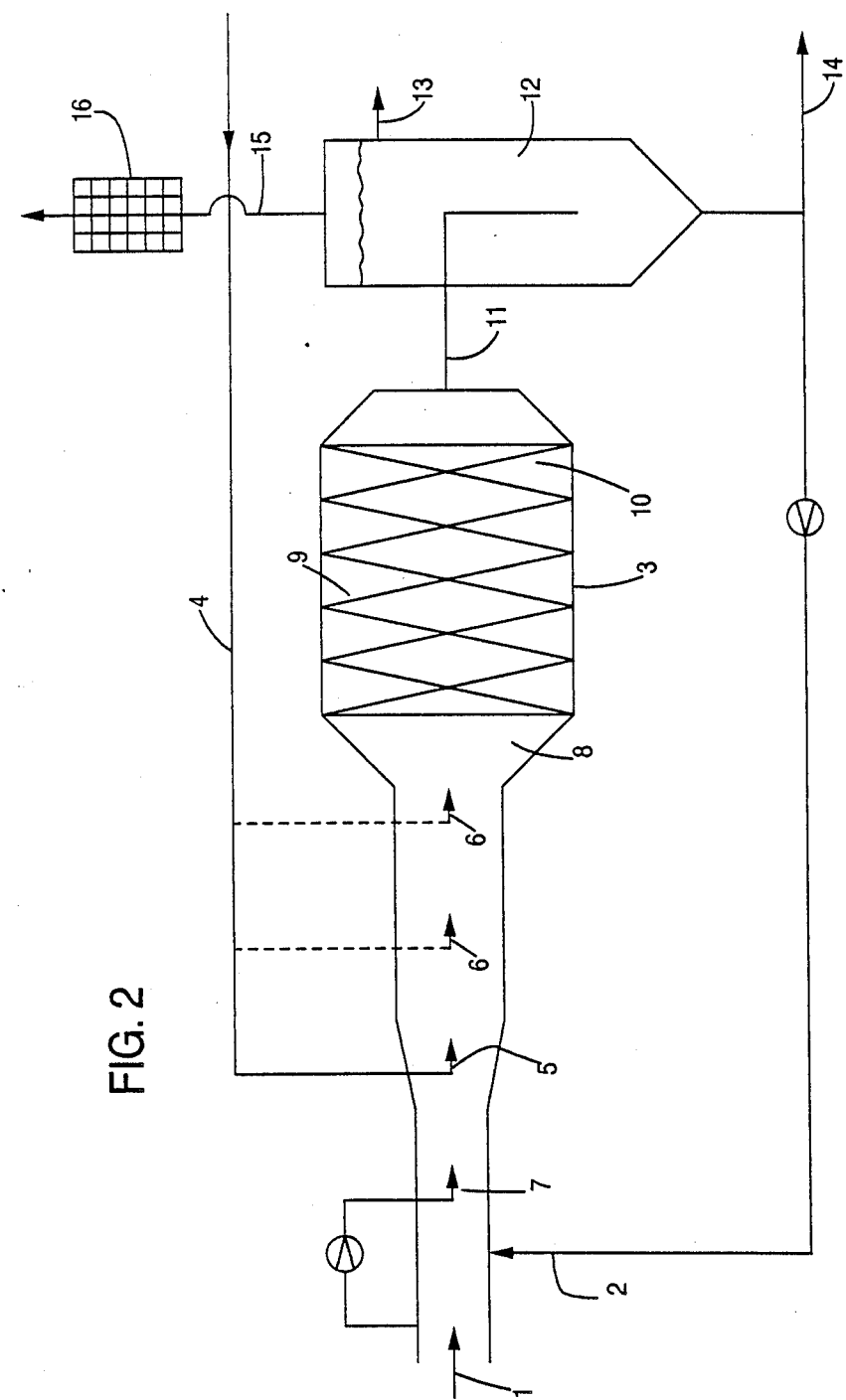
FIG. 2 shows an installation in which the reactor is constructed as a horizontally disposed pipe.

The process according to the invention can also be carried out in a horizontal reactor such as is illustrated in FIG. 2. The main construction is similar to that of the installation illustrated in FIG. 1. The only difference is that a horizontal pipe is used instead of the vertical pipe. It is also possible, however, to dispose the reactor in inclined position, for example.

After the first activated-sludge stage, an intermediate sedimentation stage can be interposed for separation of the two biocenoses if necessary. (See FIG. 3.) This is necessary in particular if nitrogen compounds are to be removed in the second stage. For this purpose the water/gas/organisms mixture is deflected by a deflector plate 8a and passed into a degassing pipe 8b. The gas can escape from there into the fixed bed, while the liquid/organisms mixture passes into the first sedimentation tank 8c, where the sludge containing the microorganisms sediments. At the same time, the separated gas passes through an opening 8e into the second activated sludge stage. The opening 8e in the simplest case can be shaped as a conical jacket. In addition, the opening can also be equipped with internals, e.g., with screen-type or perforated plates. If desired, at least part of the microorganisms can flow through the line 8d into the return line 2. Even complete removal of the sludge from the process is also possible.

Figure 3:
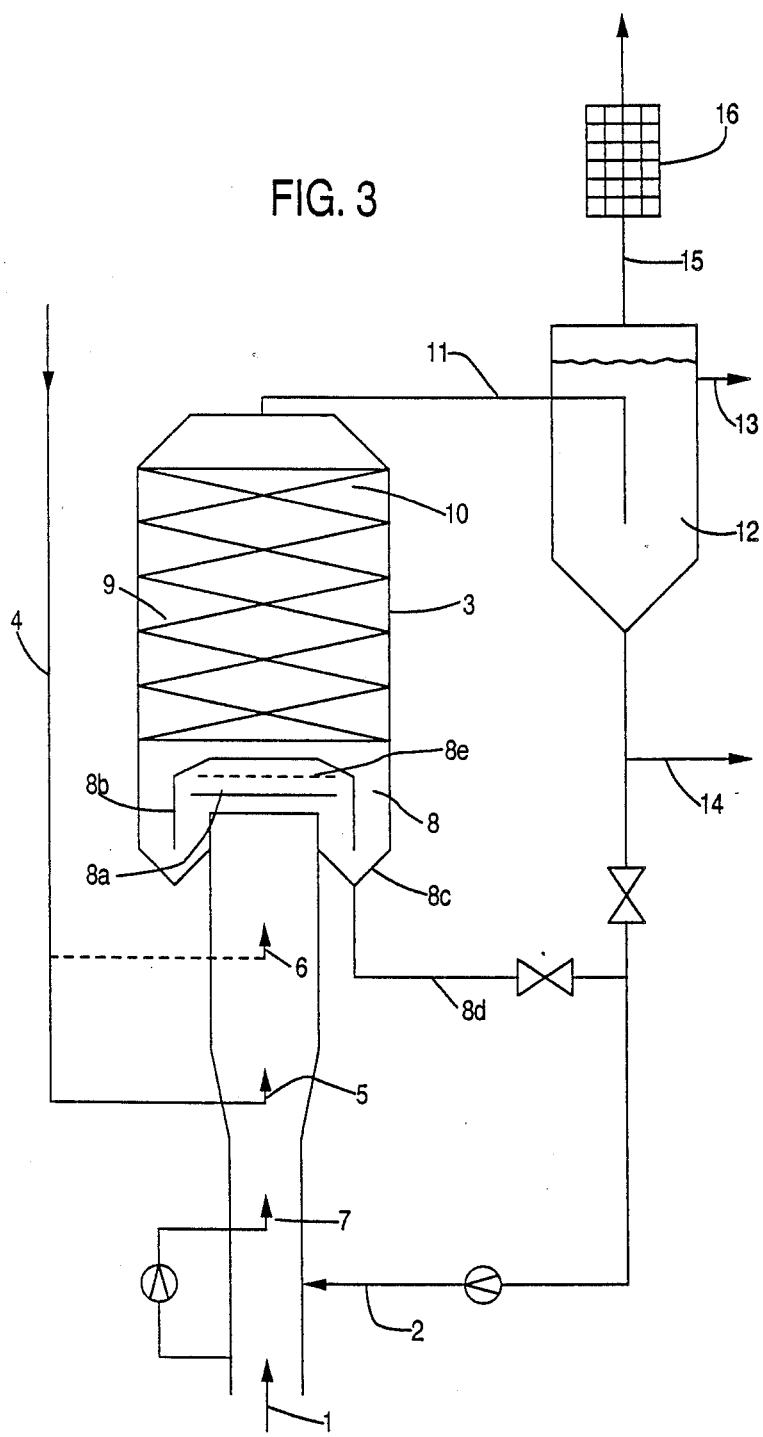
FIG. 3 shows an installation in which a sedimentation tank is disposed between the activated-sludge stages.

In the case of the vertically disposed pipe, the sedimentation tank 8c can be constructed as an annular channel, which at its upper end surrounds the outer wall of the pipe of the first activated sludge stage 8 (FIG. 3). Expediently, the annular channel is constructed with a funnel-shaped cross section, so that the sludge collects in the vertex of the funnel.

Figure 4:
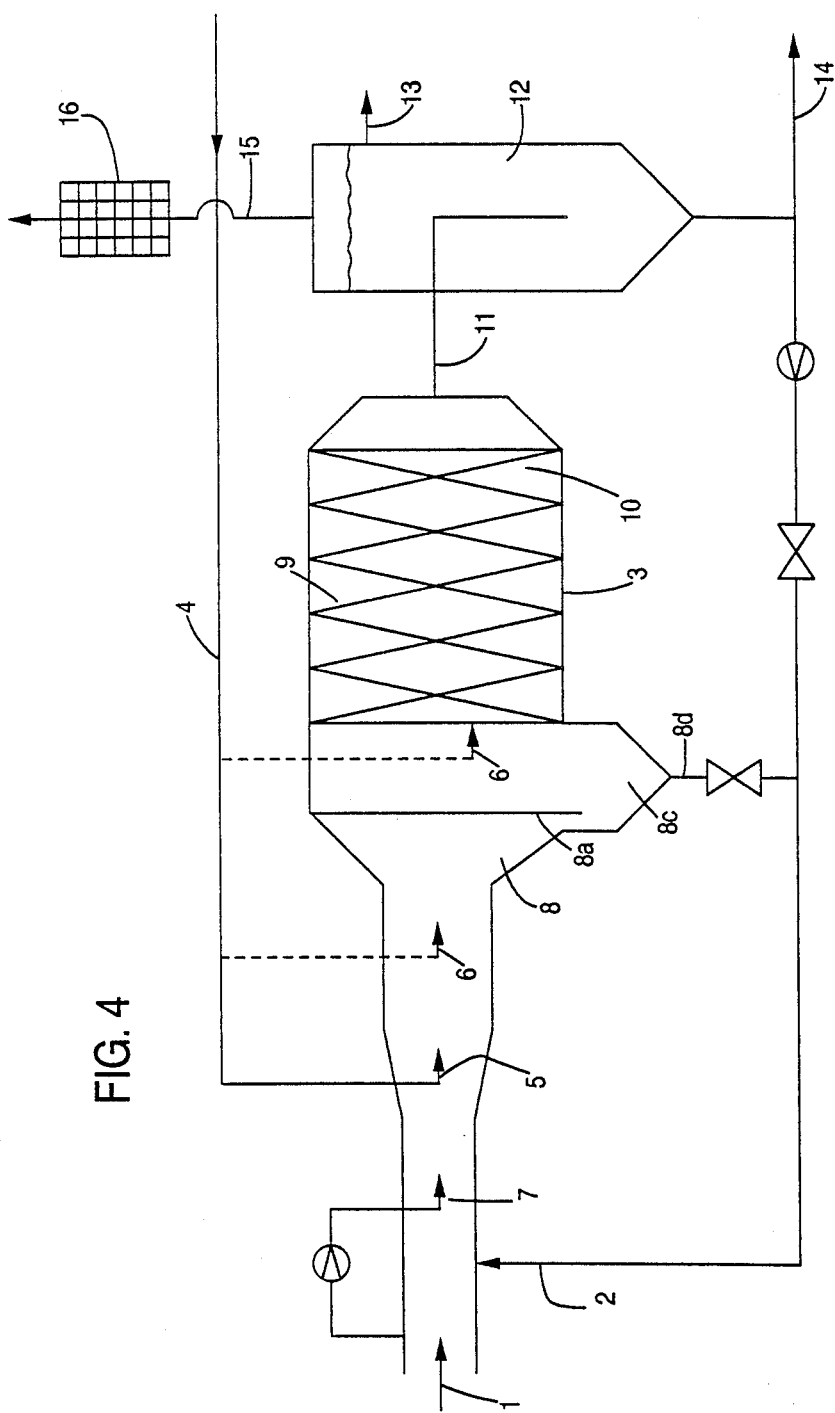
FIG. 4 shows the installation in which the reactor is constructed as a horizontal pipe with interposed sedimentation tanks.

In the case of horizontal arrangement or construction in inclined position, a bulged section can be disposed between the two activated-sludge stages, on the downward-facing side of the pipe. Expediently this is also constructed in the shape of a funnel (FIG. 4). Finally, an additional aeration nozzle 6 can be provided between deflector plate 8a and fixed bed 9.

Basically atmospheric air is used for the process according to the invention. Alternatively, however, even oxygen-enriched air or pure oxygen can be supplied. The process according to the invention is suitable for normal domestic and industrial waste water. In particular, ground water contaminated with chlorinated hydrocarbons and phenol-containing waste water of coking plants can be purified.

We claim:

1. A process for aerobic biological purification of pollutant-containing water in an apparatus consisting of an axial-flow submerged reactor and a sedimentation tank connected downstream therefrom for separation of biosludge from purified water, wherein said reactor is a pipe containing a two-stage activated-sludge chamber, said pipe comprising:

(a) a first activated-sludge stage in which a driving-jet nozzle is disposed upstream from said stage for the dispersion of air and microorganisms in waste water to be purified; and (b) a second activated-sludge stage in which internals are disposed for homogeneous dispersion of gas bubbles and microorganisms, as well as for immobilization of said microorganisms wherein said process comprises the steps of:

(i) waste water to be purified is fed through a supply line to the reactor;

(ii) microorganisms and supply air are dispersed in the waste water in the first activated-sludge stage by means of a driving-jet nozzle disposed upstream of the first stage;

(iii) the air-waste water-microorganisms mixture flows through the first activated-sludge stage and is deflected by a deflector plate into a degassing pipe, such that said mixture is degassed by means of opening into the second activated-sludge stage through which gas can pass, and said degassed mixture is passed into an intermediate sedimentation tank for separation of a sedimented mass;

(iv) the air-waste water-microorganisms mixture is subjected to a posttreatment in the second stage, such that air bubbles, microorganisms and water are homogeneously dispersed by the internals, and (v) the mixture flows through a connecting pipe into a sedimentation tank, wherein the separation of the microorganisms from the purified water takes place and outgassing is accomplished through an exhaust-air line.

2. A process according to claim 1, further comprising a step wherein sludge is passed from the intermediate sedimentation tank through a line into a return line.

3. A process according to claim 1, further comprising a step wherein air is supplied through an air supply nozzle downstream from the driving-jet nozzle.

4. A process according to claim 3, further comprising a step wherein air is supplied through additional air supply nozzles downstream from the first air supply nozzle.

5. A process according to claim 1, further comprising a step wherein hydrocarbon compounds present in the waste water are degraded in the first activated-sludge stage and nitrogen compounds are removed in the second activated-sludge stage.

6. A process according to claim 1, further comprising a step wherein microorganisms are recycled from the sedimentation tank through a return line to the first activated stage of the reactor.

7. An apparatus for aerobic biological purification of pollutant-containing waste water consisting of an axial-flow submerged reactor and a sedimentation tank connected downstream therefrom for separation of biosludge from purified water, wherein said reactor is a pipe containing a two-stage activated-sludge chamber and an intermediate sedimentation tank therebetween, said pipe comprising:

(a) a supply line attached thereto such that waste water to be purified is fed through said supply line to the pipe;

(b) a first activated-sludge stage in which (i) a driving-jet nozzle is disposed upstream from said stage for the dispersion of air, microorganisms and waste water to be purified;

(ii) a deflector plate means is located therein such that the air-microorganisms-waste water dispersion flowing therethrough is deflected by said deflector plate into a degassing pipe means; and
(iii) the degassing pipe means having opening means such that gas is passed from the dispersion into a second activated-sludge stage;
(c) an intermediate sedimentation tank through which the degassed dispersion flows for separation of a sedimented mass;
(d) a second activated-sludge stage having internal means for homogeneous dispersion of air or gas bubbles, water, and microorganisms as well as for immobilization of said microorganisms; and
(e) a connecting pipe attached thereto such that the dispersion flows through said connecting pipe into the downstream sedimentation tank, wherein the separation of the microorganisms from the purified water and outgassing takes place.

8. An apparatus according to claim 7, wherein the reactor is constructed as a vertically disposed pipe, such that the first activated-sludge stage is located upstream of the second activated-sludge stage.

9. An apparatus according to claim 7, further comprising a first aeration nozzle disposed downstream from the driving jet-nozzle.

10. An apparatus according to claim 9, further comprising additional aeration nozzles disposed downstream from the first aeration nozzle.

11. An apparatus according to claim 7, further comprising a supply line for waste water to be purified and a return line for recycled biomass, such that said lines are disposed upstream from said driving jet-nozzle.

12. An apparatus according to claim 7, wherein said internals disposed in the second activated sludge stage are fixed therein.

13. An apparatus according to claim 7, wherein said internals comprise a particulate filling material for immobilization of microorganisms.

14. An apparatus according to claim 13, wherein said particulate filling material comprises activated charcoal granules, foam glass rings, packing materials or an ordered or disordered packing.

15. An apparatus according to claim 7, wherein the reactor is constructed and arranged as a horizontal pipe.

* * * * *